UNITED STATES PATENT OFFICE.

THOMAS RUSTON, OF MONTREAL, CANADA.

IMPROVEMENT IN COMPOUND PAINT-OILS.

Specification forming part of Letters Patent No. 152,690, dated June 30, 1874; application filed April 30, 1874.

*To all whom it may concern:*

Be it known that I, THOMAS RUSTON, of the city and District of Montreal, in the Dominion of Canada, have invented a Compound Paint-Oil, of which the following is a specification:

The invention consists of an improved paint-oil for mixing with mineral earths and pigments in the manufacture of paint compounds, or for diluting any paint compound, composed by incorporating together fish-oil, petroleum-oil, and linseed-oil with or without the addition of a coagulatory liquid deposit, taken from the earth, which I call "Extract of Minerals," known as "cylinder oil." The producers call it "earth fat." It is prepared for use by a vacuum of steam. The substance is found in Northern Virginia and other Southern States. The object is to produce a cheap oil which shall readily dry and become hard.

My improved paint oil is prepared by mixing together a three-fifth part of petroleum-oil or the distilled products thereof, one-fifth part of fish-oil, and one-fifth part of linseed-oil, or about such proportions.

This compound makes a readily-drying oil, and to cause the same to give a glossy coat I add a one-fifth part of a substance which I call "Extract of Minerals," a liquid coagulatory deposit taken from the earth, and which substance or liquid has heretofore been used in the manufacture of lubricating-oils.

This compound oil is to be used in any of the forms in which paint-oil is now employed, either in the manufacture of a paint-body from mineral earths and pigments, or both combinedly by grinding the ingredients in a suitable mill, or by mixing with a paint-body as a vehicle for diluting such body to any desired consistency, to be applied with a brush as paint.

I do not limit myself to the employment of any particular kind of fish-oil; but that expressed from menhaden I find to be the best, and, secondary, that obtained from seals.

In the manufacture of my improved compound paint-oil I prefer to mix the fish-oil and petroleum together, and then add the linseed-oil, which may be either boiled or raw.

I claim as my invention—

A compound paint-oil made by mixing fish-oil, petroleum-oil, and linseed-oil, in about the proportions stated, with the addition of the "Extract of Minerals," as set forth.

THOMAS RUSTON.

Witnesses:
    JOSEPH HEWITT,
        *Of Montreal, Gentleman.*
    LILBURN G. MOIR,
        *Of Montreal, Gentleman.*